United States Patent
Rashid et al.

(10) Patent No.: US 10,285,168 B2
(45) Date of Patent: May 7, 2019

(54) SYSTEMS AND METHODS FOR ELIMINATION OF PDCCH IN RESOURCE ALLOCATION SIGNALING FOR MTC DEVICES

(71) Applicant: Intel Corporation, Santa Clara, CA (US)

(72) Inventors: Mohammad Mamunur Rashid, Hillsboro, OR (US); Satish C. Jha, Hillsboro, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 142 days.

(21) Appl. No.: 14/856,483

(22) Filed: Sep. 16, 2015

(65) Prior Publication Data
US 2017/0079012 A1    Mar. 16, 2017

(51) Int. Cl.
*H04W 72/04* (2009.01)
*H04W 56/00* (2009.01)
*H04W 72/12* (2009.01)

(52) U.S. Cl.
CPC ..... *H04W 72/042* (2013.01); *H04W 56/0005* (2013.01); *H04W 72/048* (2013.01); *H04W 72/1273* (2013.01)

(58) Field of Classification Search
CPC ..... H04W 72/00; H04W 72/02; H04W 72/04; H04W 72/12; H04W 72/1289; H04W 74/00; H04W 4/005; H04L 5/0094
See application file for complete search history.

(56) References Cited

U.S. PATENT DOCUMENTS

| | | | | |
|---|---|---|---|---|
| 8,423,853 B2 * | 4/2013 | Bourlas | ............. | H04L 1/1861 714/748 |
| 8,712,459 B2 * | 4/2014 | Lim | ............. | H04W 4/005 455/452.1 |
| 8,811,323 B2 * | 8/2014 | Kim | ............. | H04L 1/1851 370/329 |
| 9,693,264 B2 * | 6/2017 | Kim | ............. | H04W 28/26 |
| 2002/0159384 A1 * | 10/2002 | Classon | ............. | H04L 1/1819 370/216 |
| 2011/0134774 A1 * | 6/2011 | Pelletier | ............. | H04W 52/365 370/252 |
| 2011/0194511 A1 * | 8/2011 | Chen | ............. | H04W 72/121 370/329 |
| 2013/0044676 A1 * | 2/2013 | Kim | ............. | H04L 1/1607 370/315 |

(Continued)

FOREIGN PATENT DOCUMENTS

WO    2015127424 A1    8/2015

OTHER PUBLICATIONS

PCT/US2016/046167, International Search Report and Written Opinion, dated Nov. 8, 2016, 13 pages.

*Primary Examiner* — Hassan Kizou
*Assistant Examiner* — Roberta A Shand
(74) *Attorney, Agent, or Firm* — Stoel Rives LLP

(57) ABSTRACT

Systems and methods provide resource allocation signaling for low cost machine type communication (LC-MTC) devices with the elimination of the physical downlink control channel (PDCCH) in long term evolution (LTE) communication systems. Disclosed systems and methods provide alternative light-weight, efficient control signaling for resource allocation of LC-MTC devices.

23 Claims, 5 Drawing Sheets

(56) References Cited

U.S. PATENT DOCUMENTS

| | | | |
|---|---|---|---|
| 2013/0315159 A1* | 11/2013 | Xia | H04W 72/042 370/329 |
| 2014/0092829 A1 | 4/2014 | Han et al. | |
| 2014/0105191 A1 | 4/2014 | Yang et al. | |
| 2014/0185495 A1* | 7/2014 | Kuchibhotla | H04W 76/023 370/281 |
| 2015/0092554 A1* | 4/2015 | Mochizuki | H04W 76/046 370/235 |

* cited by examiner

SYSTEMS AND METHODS FOR ELIMINATION OF PDCCH IN RESOURCE ALLOCATION SIGNALING FOR MTC DEVICES

TECHNICAL FIELD

This disclosure relates generally to wireless communication networks. Specifically, this disclosure relates to low-cost machine type communication (MTC) devices.

BACKGROUND

Machine type communication (MTC), also called machine to machine (M2M) communication, is of interest to mobile network operators, equipment vendors, MTC specialist companies, and research bodies. M2M communications enable M2M components to be interconnected, networked, and controlled remotely with low-cost scalable and reliable technologies. Such M2M communications could be carried over mobile networks, in which case the role of mobile network is largely confined to serve as a transport network.

A user equipment device (or simply, UE) used as an MTC device for MTC communications in MTC applications (or simply, MTC) has characteristics such as being nomadically (re-)deployed, having low mobility while deployed, being deployed in locations with low signal strength (e.g., in "poor coverage areas"), providing low priority communications, and infrequently sending small amounts of mobile originated (MO) or mobile terminated (MT) data.

Consumer electronics, including devices such as eBook readers, digital cameras, personal computers, and navigation systems, could also benefit from monitoring. For example, such devices could use monitoring to upgrade firmware or to upload and download online content

DETAILED DESCRIPTION OF PREFERRED EMBODIMENTS

Figure 1:
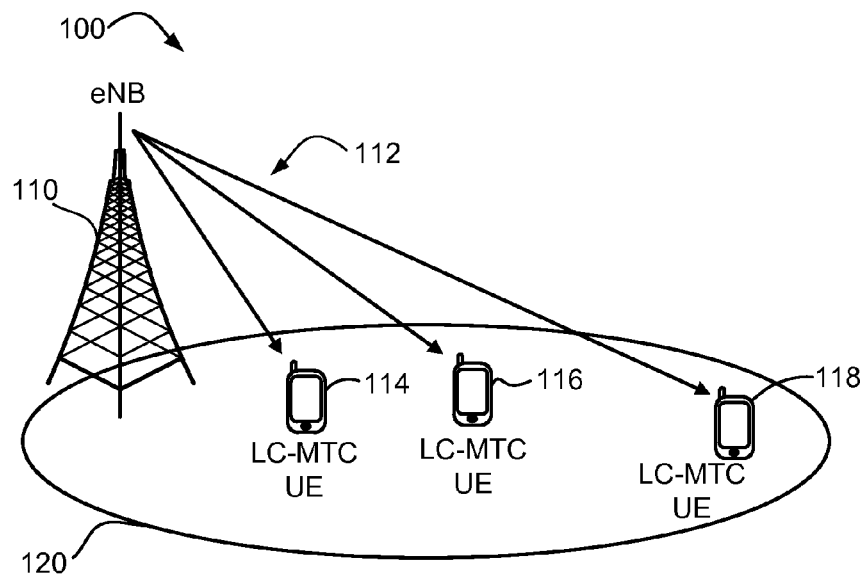
FIG. 1 is a block diagram of a communication according to certain embodiments.

Certain embodiments disclosed herein provide resource allocation signaling for low cost MTC (LC-MTC) devices with the elimination of the physical downlink control channel (PDCCH) in long term evolution (LTE) communication systems. Disclosed systems and methods provide alternative light-weight, efficient control signaling for resource allocation of LC-MTC devices.

Wireless mobile communication technology uses various standards and protocols to transmit data between a base station and a wireless communication device. Wireless communication system standards and protocols can include, for example, the 3rd Generation Partnership Project (3GPP) LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet. LTE networks include radio access technology (RAT) and core radio network architecture that can provide high data rate, low latency, packet optimization, and improved system capacity and coverage.

LTE networks may be used to support MTC applications, thereby enabling a ubiquitous computing environment (e.g., an "Internet of Things (IoT)"). MTC applications may include smart metering, healthcare monitoring, remote security surveillance, intelligent transportation systems, or the like. Existing mobile broadband networks may be designed to optimize performance mainly for human type communication and thus are not designed or optimized for MTC related requirements. For example, objectives for MTC devices may include lower device cost, enhanced coverage, and reduced power consumption.

There is an ongoing effort to develop low-cost MTC for LTE in 3GPP standards. An LC-MTC device may be a low complex device with limited processing capability. LC-MTC devices may also consume low power and handle delay tolerant traffic. For example, a reduced UE bandwidth of 1.4 MHz (as compared to 10 MHz to 20 MHz) may be used in the downlink (DL) and uplink (UL) directions. The UE may have reduced complexity to support only the reduced bandwidth at the baseband and RF stages. For example, the UE may be configured to handle only six physical resource blocks (PRBs) of data. In some embodiments, the bandwidth may be even smaller (e.g., equal to the bandwidth of a single PRB). The reduced bandwidth may result in a reduction in transport block size (TBS) that can be transmitted in one transmission time interval (TTI). For example, for a resource allocation of one PRB pair, the maximum TBS may be 280 bits in some embodiments.

There are opportunities and/or solution approaches to define further low cost MTC device categories and to achieve coverage enhancement in an LTE network. One example includes targeting a relative LTE coverage improvement (e.g., corresponding to 15 dB for frequency division duplex (FDD) communication) for an LC-MTC UE category/type and other UEs operating delay tolerant MTC applications with respect to their respective nominal coverage. Techniques (which may be applicable for both FDD and time division duplex (TDD) communication) for achieving these and other objectives may include, for example, subframe bundling techniques with hybrid automatic repeat request (HARQ) for physical data channels (e.g., physical downlink shared channel (PDSCH) and/or physical uplink shared channel (PUSCH)), and eliminating the use of control channels (e.g., physical control format indicator channel (PCFICH) and/or PDCCH). Certain embodiments disclosed here eliminate PDCCH for LC-MTC devices so that more resources may be used for actual data transmission.

In one embodiment, after an LC-MTC UE synchronizes in the uplink, if the eNB has downlink transmission for the LC-MTC UE, then the downlink transmission is included in a certain location in the PDSCH and the LC-MTC UE looks for a downlink allocation only at that location. The default location in the PDSCH for the potential allocation may be computable from a UE identifier (ID) and the associated default transmit parameters may be pre-fixed or predetermined. However, the eNB may semi-statically change the location and associated transmit parameters if such change is signaled through a successful downlink transmission to the LC-MTC UE. In certain embodiments, multiple UEs may map to the same PDSCH location for potential downlink transmission, but at any given subframe the eNB will allocate that location to only one target UE and the cyclic redundancy check (CRC) belonging to that transmission will be scrambled by the cell radio network temporary identifier (C-RNTI), or other UE ID, of the target UE. All the UEs whose resource allocations are mapped to the same location will try to decode the bits, but only the targeted UE may be able to successfully read the data and send a hybrid automatic repeat request (HARQ) acknowledgement (ACK). In addition, or in other embodiments, a simple sub-header is included in the beginning of downlink transmissions to indicate the type of transmission (e.g., downlink data, semi-static updates to downlink resource allocation, or uplink grant).

FIG. 1 is a block diagram of a communication network 100 including a base station node (eNB 110) configured to communicate uplink and downlink user data with a plurality of UEs (LC-MTC UEs 114, 116, 118) according to certain embodiments. The LC-MTC UEs 114, 116, 118 are shown within a coverage area 120 of the eNB 110. Persons skilled in the art will recognize from the disclosure herein that embodiments may apply to a single LC-MTC UE (e.g., LC-MTC UE 114) or to many more UEs (e.g., hundreds of UEs or more). In the simplified example shown in FIG. 1, the three shown LC-MTC UEs 114, 116, 118 send an attach request to the eNB 100 to establish uplink synchronization. During the respective uplink processes, each LC-MTC UE 114, 116, 118 is assigned a unique C-RNTI. After uplink synchronization, each LC-MTC UE 114, 116, 118 is configured to receive an LTE downlink signal 112 from the eNB 110. The LTE downlink signal 112 is divided into frames and subframes, as understood by those skilled in the art. The LTE downlink signal 112 includes a PDSCH in each subframe. In certain embodiments, however, the LTE downlink signal 112 does not include, or the LC-MTC UEs 114, 116, 118 do not detect or decode, a PDCCH.

The LC-MTC UEs 114, 116, 118 look for potential downlink transmissions in PDSCH locations and associated transmission parameters that the respective UE can determine without receiving and decoding data in a PDCCH. For example, after the LC-MTC UE 114 achieves uplink synchronization and obtains a C-RNTI, the LC-MTC UE 114 looks for potential downlink transmissions only at a default (unless changed semi-statically as described below) PDSCH location that can be determined using the C-RNTI of the LC-MTC UE 114. The LC-MTC UE 114 may, for example, access a look up table in its C-RNTI or execute a variety of different algorithms or functions to calculate the default location from the C-RNTI. A default size, modulation and coding scheme (MCS), and other transmission parameters associated with the default allocation may be fixed according to certain embodiments for LC-MTC devices.

Figure 2:
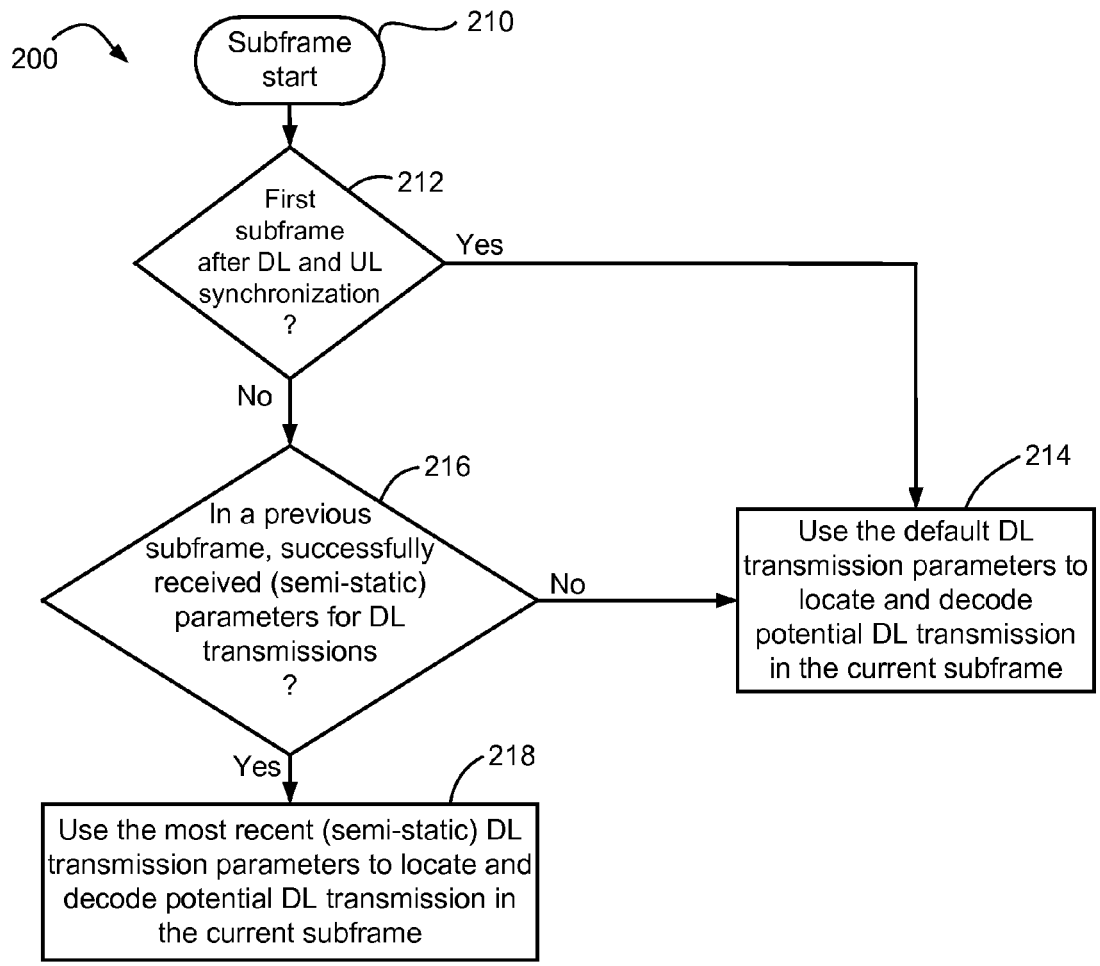
FIG. 2 is a flowchart of a method for updating downlink transmission parameters according to one embodiment.

The potential PDSCH location and the corresponding transmission parameters for a given LC-MTC UE (e.g., the LC-MTC UE 114) may be changed semi-statically after a successful downlink transmission, if the eNB 110 signals such change through a successful downlink transmission. For example, FIG. 2 is a flowchart of a method 200 for updating downlink transmission parameters according to one embodiment. The method 200 may be used by the LC-MTC UEs 114, 116, 118.

The method 200 includes, after a current subframe start 210, determining 212 whether the current subframe is a first subframe after downlink (DL) and uplink (UL) synchronization. If it is the first subframe, the method 200 uses 214 the default DL transmission parameters to locate and decode potential DL transmission in the current subframe. If, however, it is not the first subframe, the method 200 includes determining 216 whether, in a previous subframe, semi-static parameters for downlink transmissions were successfully received. If not, the method 200 again uses 214 the default DL transmission parameters to locate and decode potential DL transmission in the current subframe. If updated semi-static parameters for DL transmissions were previously received, the method 200 uses 218 the most recent semi-static DL transmission parameters to locate and decode a potential DL transmission in the current subframe. In certain embodiments, the eNB 110 will only use the updated PDSCH location and transmission parameters if the eNB 110 receives an indication from the target UE (e.g., the LC-MTC UE 114) of a successful reception of the DL transmission that contains such an update.

To avoid resource underutilization, according to certain embodiments, the potential location for the downlink resource allocation may be the same for multiple LC-MTC UEs. For example, two or all three of the LC-MTC UEs 114, 116, 118 shown in FIG. 1 may be mapped to the same PDSCH location. However, the eNB 110 is configured to schedule a transmission for only one UE at a particular PDSCH location at any given subframe. Although all the LC-MTC UEs mapped to a given PDSCH location may try to decode a certain number of PRBs starting from that location, only the targeted UE in such an embodiment will be able to successfully decode and process the allocation.

In addition to carrying downlink data or updated downlink transmission parameters in the payload of a downlink transmission, or in other embodiments, an uplink resource allocation (i.e., uplink grant) may be carried as downlink control information (DCI) in the payload of the downlink transmission. According to certain such embodiments, the timing between the allocation signaling of the uplink grant and the actual allocation follows the currently standardized protocol or a customized value for LC-MTC.

Figure 3:
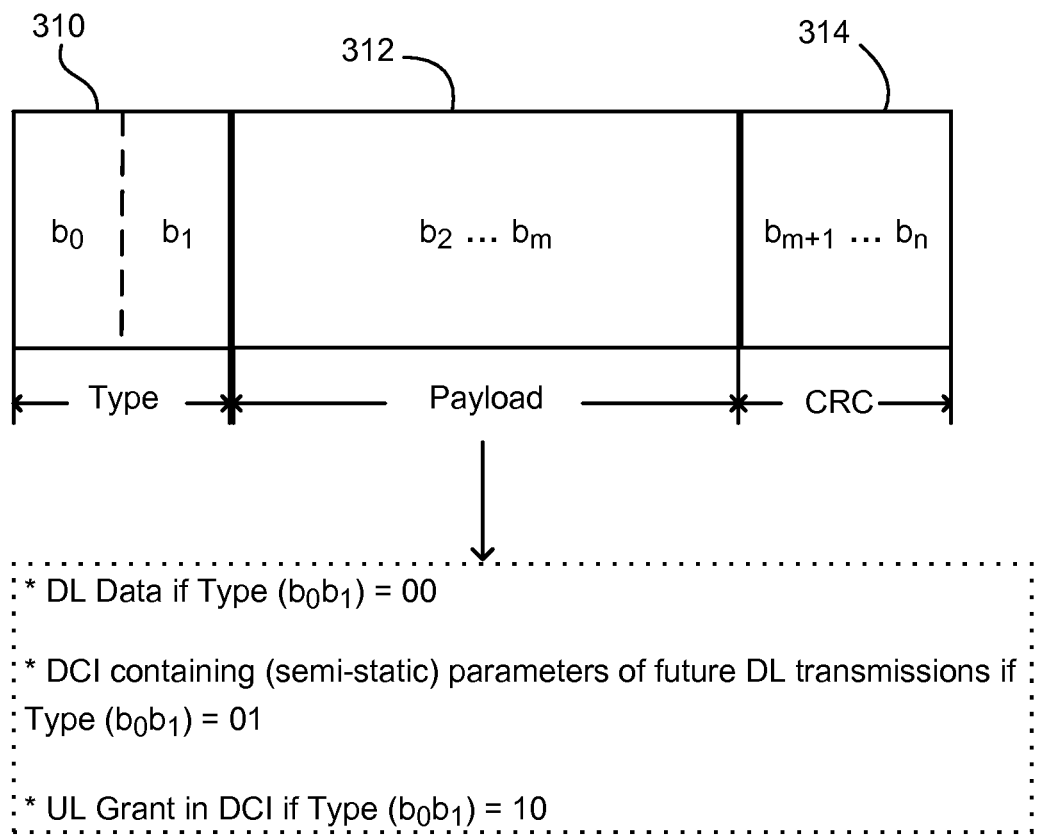
FIG. 3 is a block diagram illustrating a format for bits in a downlink transmission according to one embodiment.

In one embodiment, a downlink transmission format for LC-MTC includes a sub-header to indicate different types of transmissions. For example, FIG. 3 is a block diagram illustrating a format for bits in a downlink transmission according to one embodiment. The format includes a two bit sub-header 310 with bits $b_0$ and $b_1$ to indicate the type of payload 312. The format also includes a CRC 314. In the example shown in FIG. 3, the payload 312 includes bits b2 to $b_m$ and the CRC 314 includes bits $b_{m+1}$ to $b_n$. Also, in this example, if the sub-header bits $b_0 b_1 = 00$ then the payload 312 is a regular downlink transmission that includes downlink data (e.g., user data); if the sub-header bits $b_0 b_1 = 01$ then the payload 312 includes DCI with a semi-static update to downlink transmission parameters; or if the sub-header bits $b_0 b_1 = 10$ then the payload 312 includes DCI with an uplink grant. Thus the payload 312 depends on the type field in the sub-header 310 and the CRC 314 is scrambled with the C-RNTI of the target UE.

The downlink transmission parameters in the DCI include parameters used to identify a PDSCH location where, for example, the LC-MTC UE 114 is mapped for downlink resource allocation and where the LC-MTC UE 114 may have future downlink transmissions. Contrary to regular interpretation of a DCI, in certain embodiments, the LC-MTC UE 114 does not always have an allocation in the PDSCH location that it is mapped to. Rather, if the LC-MTC UE 114 has any downlink allocation in a subframe, the allocation is in the mapped PDSCH location and the LC-MTC UE 114 may be able to successfully decode that data. However, in a given subframe, the LC-MTC UE 114 may not have a downlink transmission at its mapped PDSCH location and in such case, the LC-MTC UE 114 tries but fails to decode data in that location.

When PDCCH is used in an LTE system, a UE sends a HARQ negative ACK (NACK) as an indication that the UE received the PDCCH successfully but was unable to decode the PDSCH data that the PDCCH refers to. A lack of either an ACK or a NACK when PDCCH is used to schedule a downlink transmission indicates that the UE failed to even receive the allocation information in the PDCCH. In certain embodiments disclosed herein, however, as there is no PDCCH transmission used for conveying allocation information in a subframe, a HARQ NACK becomes unnecessary and, when multiple UEs are mapped to the same PDSCH location, may increase overhead signaling.

Thus, certain embodiments use a modified HARQ process with an implied NACK for LC-MTC UEs 114, 116, 118. If, for example, the LC-MTC UE 114 is not able to decode data at the PDSCH location mapped for its potential downlink transmission, the LC-MTC UE 114 simply refrains from sending a NACK in the physical uplink control channel (PUCCH). Because a plurality of UEs (e.g., each of the LC-MTC UEs 114, 116, 118) may be mapped to the same PDSCH location for potential downlink transmission but only one target UE (e.g., the LC-MTC UE 114) may have allocation in the PDSCH location in a subframe, sending of NACK by all other LC-MTC UEs (e.g., LC-MTC UEs 116, 118) mapped to that particular PDSCH location is costly from a signaling overhead perspective. On the other hand, if the target UE (e.g., LC-MTC UE 114) can decode its downlink transmission successfully, then the target UE sends an ACK in a subsequent subframe according to regular ACK timing.

If the eNB 110, after sending the downlink transmission to the target UE (e.g., the LC-MTC UE 114), does not receive an ACK from the UE at the appropriate subframe, the eNB 110 assumes this to be an implicit NACK and repeats the transmission according to regular retransmission timing. In addition, or in other embodiments, the HARQ type for low-complexity devices such as the LC-MTC UEs 114, 116, 118 is proposed to be limited to chase-combining (rather than incremental redundancy combining) wherein the same information and parity bits are retransmitted each time. If incremental redundancy were to be used, signaling HARQ redundancy versions inside the downlink transmission may not be feasible in certain embodiments as the target UE would need the redundancy information to decode the downlink transmission itself.

Figure 4:
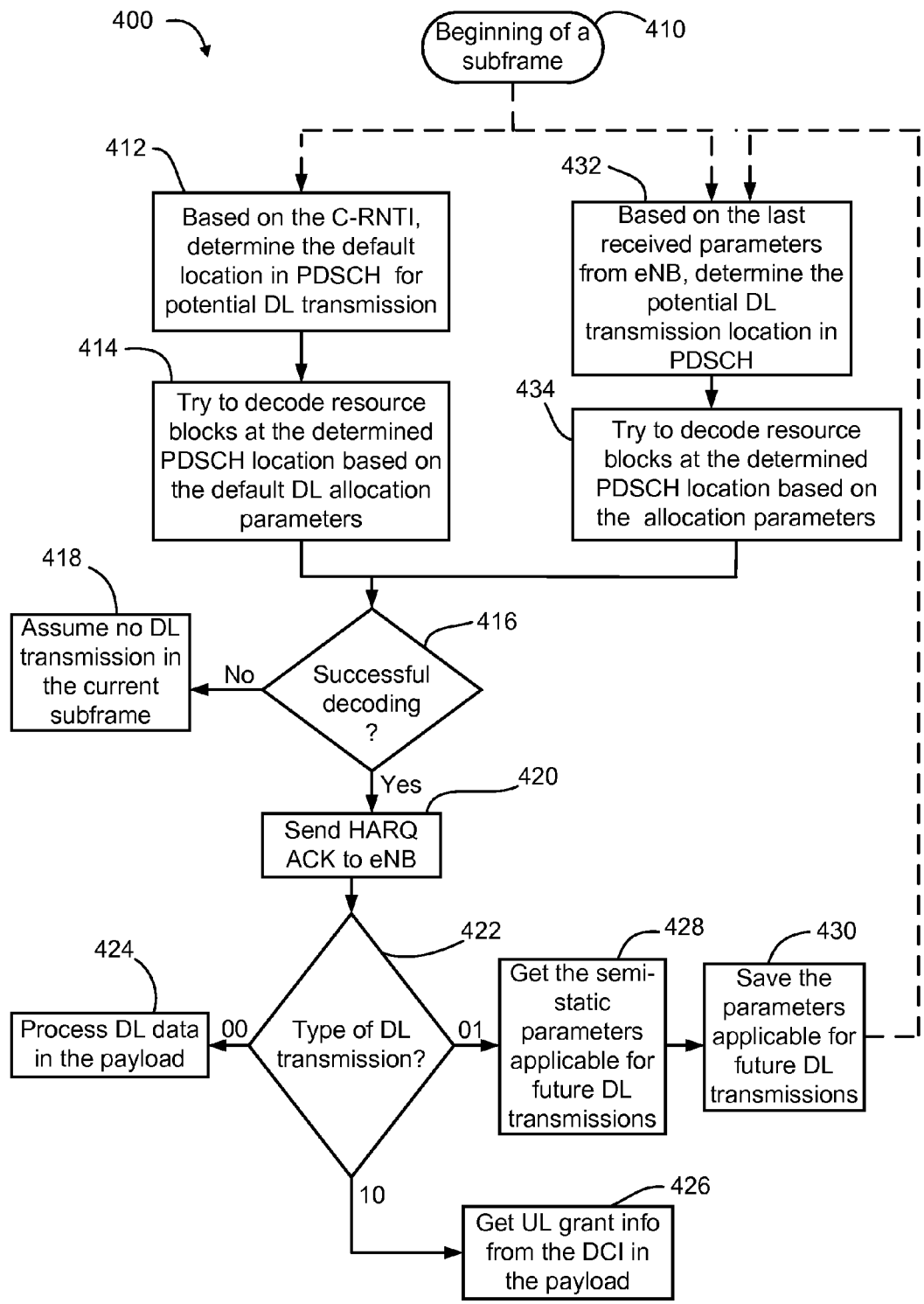
FIG. 4 is a flowchart of a method for resource allocation signaling according to one embodiment.

FIG. 4 is a flowchart of a method 400 for UE operation for resource allocation signaling without PDCCH according to one embodiment. The method 400 includes, after a beginning 410 of a current subframe of an LTE downlink signal, the UE (e.g., the LC-MTC UE 114 shown in FIG. 1) uses either default downlink transmission parameters, or if received in a previous subframe, updated downlink transmission parameters (see, e.g., FIG. 2). If using default downlink transmission parameters, based on the C-RNTI of the UE, the UE determines the default location in PDSCH for potential downlink (DL) transmission, and tries 414 to decode resource blocks at the determined PDSCH location based on the default downlink allocation parameters.

The UE then queries 416 whether or not the attempted decoding is successful. If the decoding is not successful, the UE assumes 418 that there is no downlink transmission in the current subframe (and does not send a HARQ NACK). If, however, the decoding is successful, the UE sends 420 a HARQ ACK to the eNB, and queries the type of downlink transmission. As discussed above with respect to FIG. 3, the determination of the type of payload may be based on a two bit sub-header in the decoded downlink transmission. Following the example of FIG. 3, if the two bits are 00 then the UE processes 424 the downlink data in the payload; if the two bits are 10 then the UE gets the uplink (UL) grant information from the DCI in the payload; and if the two bits are 01 then the UE gets 428 the semi-static parameters applicable for future downlink transmissions and saves 430 the parameters applicable for future downlink transmissions.

Accordingly, in a next subframe, based on the last received parameters applicable for future downlink transmissions received from the eNB, the UE determines 432 the potential downlink transmission location in the PDSCH, and tries 434 to decode resource blocks at the determined PDSCH location based on the allocation parameters. The UE then follows the method discussed above by querying 416 whether or not the attempted decoding is successful.

Figure 5:
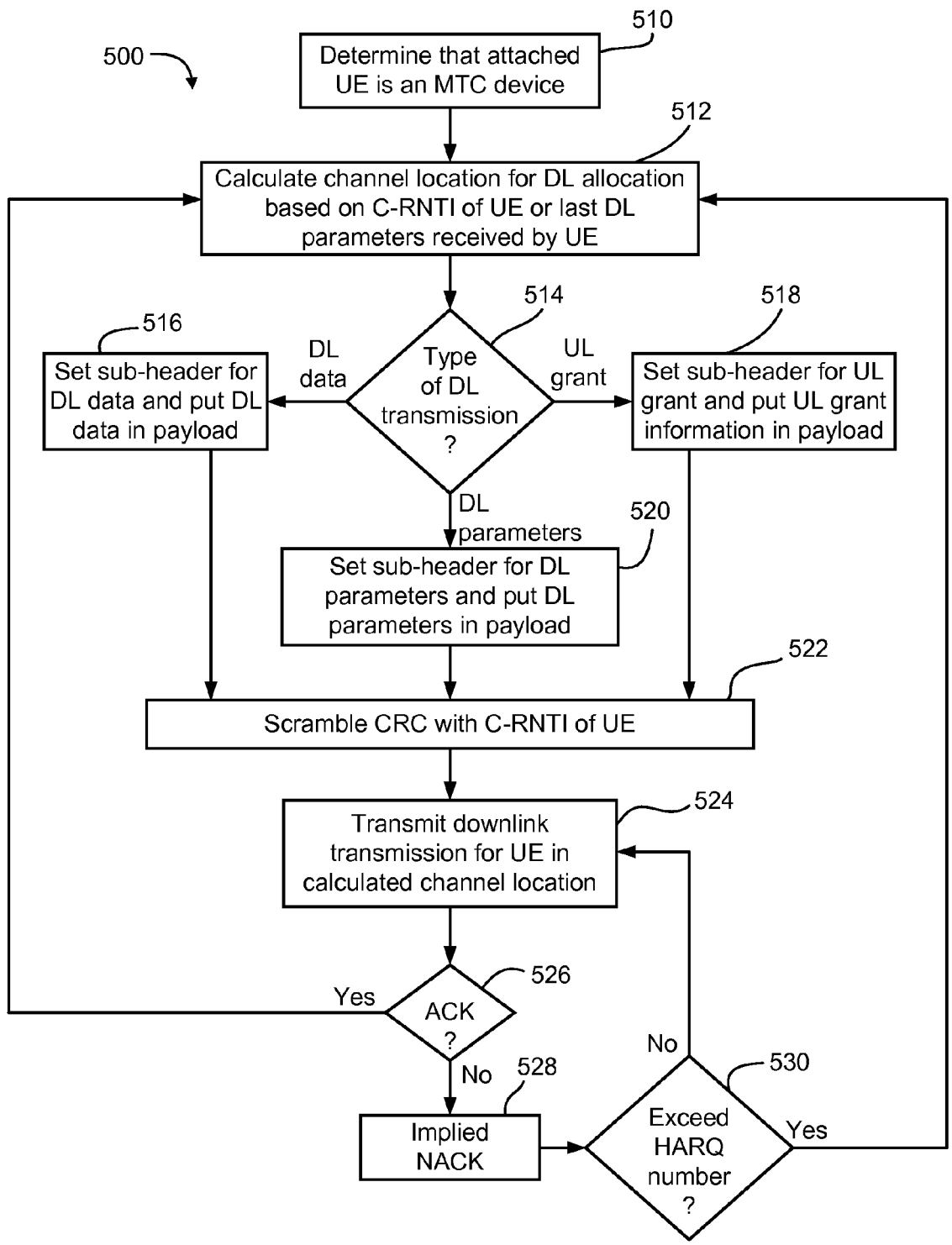
FIG. 5 is a flowchart of a method for resource allocation signaling according to another embodiment.

FIG. 5 is a flowchart of a method 500 for eNB operation for resource allocation signaling without PDCCH according to one embodiment. The method 500 includes the eNB determining 510 that an attached UE is an MTC device. In response to the determination, the eNB calculates 512 a channel location for downlink (DL) allocation based on a C-RNTI corresponding to the UE or, if the downlink transmission parameters associated with the UE have been successfully updated, based on the last downlink transmission parameters received by the UE. The eNB queries 514 a type of downlink transmission to send to the UE. If the type corresponds to downlink data, the eNB sets 516 a sub-header of the downlink transmission to indicate the downlink data type and stores the downlink data in the payload of the downlink transmission. If the type corresponds to an uplink (UL) grant of resources for the UE, the eNB sets 518 the sub-header to indicate the uplink grant type and stores the corresponding uplink grant information in the payload. If the type corresponds to updated downlink parameter, the eNB sets 520 the sub-header to indicate the downlink parameters type and stores the downlink parameters in the payload. The eNB may determine to send updated downlink parameters based on, for example, channel quality, quality of service (QoS), and/or other current conditions.

The eNB scrambles 522 the CRC of the downlink transmission with the C-RNTI of the UE and transmits 524 the downlink transmission for the UE in the calculated channel location. The eNB then waits for an ACK 526 from the UE. If the ACK is received within a predetermined period of time, the eNB determines that the UE successfully received the downlink transmission and, if a new downlink transmission is available to send to the UE, returns to calculate 512 the channel location. If the ACK is not received within the predetermined period of time, the eNB assumes an implied NACK 528 and queries 530 whether the HARQ number has been exceeded. In certain embodiments, the number of HARQ retransmission attempts may be predetermined (e.g., fixed to 1, 2, 4, 8, 16, etc.). In other embodiments, the eNB may dynamically change the number of HARQ retransmission attempts. If the HARQ number has not been exceeded, the eNB again transmits 524 the downlink transmission for the UE in the calculated channel location. In certain embodiments, the retransmission includes the same data and parity bits (e.g., chase-combining). If the number of HARQ retransmissions is exceeded the downlink transmission fails and, if a new downlink transmission is available to send to the UE, returns to calculate 512 the channel location. If a downlink transmission including update downlink parameters fails, the eNB uses the previous channel location and other downlink parameters for the next downlink transmission.

Certain embodiments disclosed herein provide resource allocation signaling in the absence of PDCCH transmission for LC-MTC UEs. According to such embodiments, after the synchronization in the uplink, a particular LC-MTC UE will look for potential DL transmission only at a specific PDSCH location. The default location for such potential location are computable from the UE ID (i.e., C-RNTI), and the associated transmit parameters are pre-defined and known. However, the location and associated transmit parameters can be changed semi-statically if such change is signaled through a successful DL transmission.

In addition, or in other embodiments, a new format for DL transmissions is provided for LC-MTC UEs, whereby a DL transmission includes the first two bits dedicated for signaling the type of content in the transmission. The payload depends on the type field and can be either of: DL data; signaling for a semi-static update to DL transmission parameters; or UL grant.

Certain embodiments provide a method for efficient multiplexing of PDSCH resources among LC-MTC UEs whereby a potential location for the DL resource allocation can be shared among multiple LC-MTC UEs. However, the eNB schedules transmission for only one UE at a particular PDSCH location at any given subframe. Although all the LC-MTC UEs mapped to a given PDSCH location may try to decode a certain number of resource blocks starting from that location, only the targeted UE is able to successfully decode and process the allocation as the CRC is scrambled with the C-RNTI (UE ID) of the targeted UE.

Certain embodiments include modifications to the HARQ mechanism to support the resource allocation mechanism.

Certain embodiments include enhancements for the LC-MTC UE operation to work seamlessly with the proposed resource allocation mechanism.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
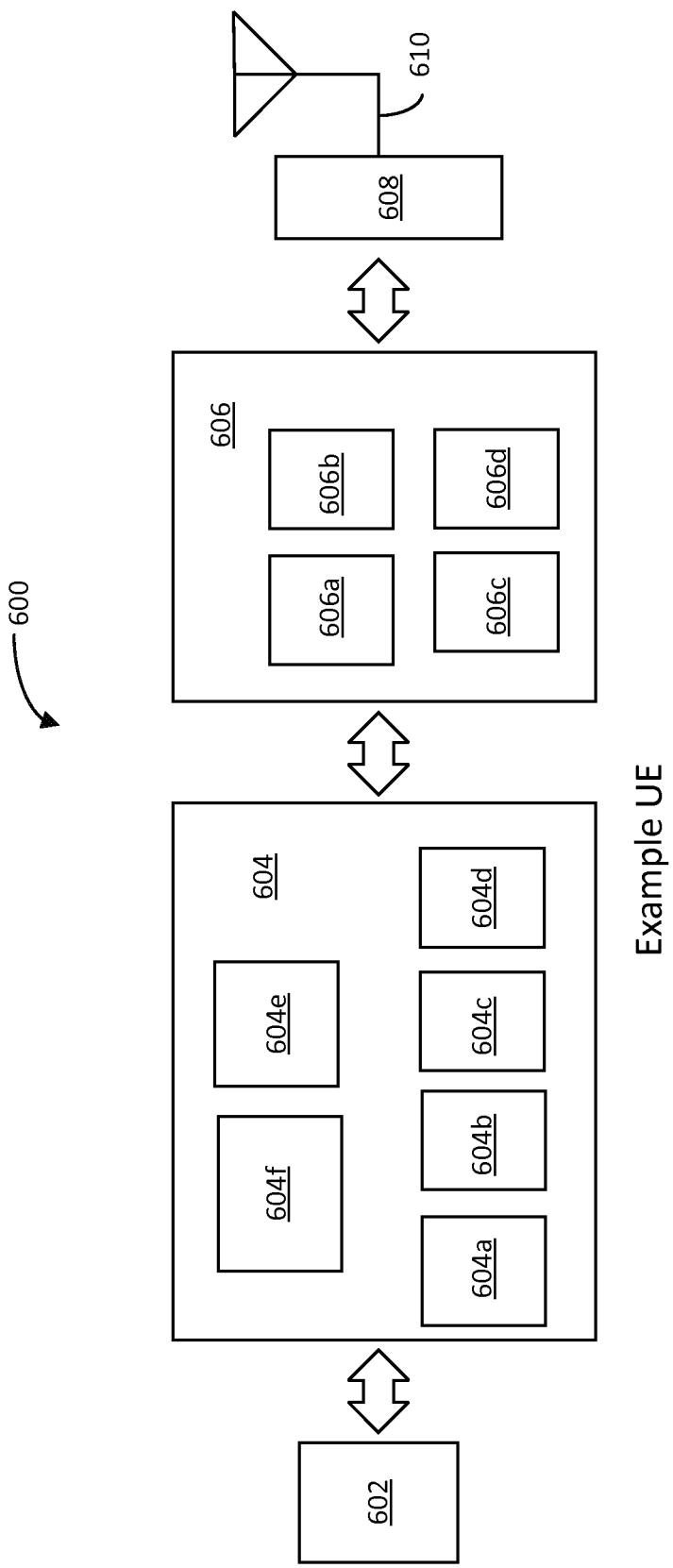
FIG. 6 illustrates, for one embodiment, example components of a user equipment device.

Embodiments described herein may be implemented into a system using any suitably configured hardware and/or software. FIG. 6 illustrates, for one embodiment, example components of a UE device 600. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, a third generation (3G) baseband processor 604b, a fourth generation (4G) baseband processor 604c, and/or other baseband processor(s) 604d for other existing generations or generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP, and/or RRC layers. In some embodiments, the baseband circuitry 604 may include one or more audio digital signal processor(s) (DSP) 604f. The audio DSP(s) 604f may include elements for compression/decompression and echo cancellation and may include other suitable processing elements in other embodiments. Components of the baseband circuitry 604 may be suitably combined in a single chip or single chipset, or disposed on a same circuit board in some embodiments.

In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., to facilitate the communication with the wireless network. RF circuitry 606 may include a receive signal path, which may include circuitry to down-convert RF signals received from the FEM circuitry 608 and provide baseband signals to the baseband circuitry 604. RF circuitry 606 may also include a transmit signal path, which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b, and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals, and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 606 may include analog-to-digital converter (ADC) and digital-to-analog converter (DAC) circuitry, and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602, depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer, and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals, and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The receive signal path of the FEM 608 circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the UE device 600 may include additional elements, such as, for example, memory/storage, a display, a camera, a sensor, and/or an input/output (I/O) interface.

EXAMPLES

The following examples pertain to further embodiments.

Example 1 is a user equipment (UE) including circuitry and a wireless transceiver to communicate with an Evolved Universal Terrestrial Radio Access Network (E-UTRAN) Node B (eNB). The circuitry is configured to perform uplink synchronization with the eNB and determine, based on a UE identifier (ID), a first physical downlink shared channel (PDSCH) location for a downlink transmission. The circuitry is further configured to, in a first subframe from the eNB, attempt to decode one or more resource blocks at the first PDSCH location based on the UE ID and predetermined downlink transmission parameters.

Example 2 includes the UE of Example 1, wherein the circuitry is further configured to, in response to a successful decode of the one or more resource blocks at the first PDSCH location, determine that the one or more resource blocks comprises one of downlink user data, updated downlink transmission parameters, or an uplink grant.

Example 3 includes the UE of Example 2, wherein the updated downlink transmission parameters comprise at least one of a second PDSCH location for downlink transmissions and a modulation and coding scheme (MCS).

Example 4 includes the UE of any of Examples 1-3, wherein the circuitry is further configured to, in a second subframe from the eNB, attempt to decode one or more second resource blocks at the second PDSCH location based on the UE ID and the updated downlink transmission parameters.

Example 5 includes the UE of any of Examples 1-4, wherein the downlink transmission corresponding to the one or more resource blocks at the first PDSCH location comprises a two bit sub-header to indicate whether the downlink transmission comprises the downlink user data, the updated downlink transmission parameters, or an the uplink grant.

Example 6 includes the UE of any of Examples 1-5, wherein the UE ID comprises a cell radio network temporary identifier (C-RNTI) assigned by the eNB during uplink synchronization, and wherein the attempt to decode one or more resource blocks comprises decoding a cyclic redundancy check (CRC) scrambled with the C-RNTI.

Example 7 includes the UE of any of Examples 1-6, wherein the circuitry is further configured to: if the attempt to decode the one or more resource blocks at the PDSCH location is unsuccessful, determine that the first subframe does not include a downlink transmission for the UE; and if the attempt to decode the one or more resource blocks at the PDSCH location is successful, send a hybrid automatic repeat request (HARQ) acknowledgment (ACK) to the eNB.

Example 8 includes the UE of Example 7, wherein the circuitry is further configured to not send a HARQ negative acknowledgment (NACK) in response to the unsuccessful attempt to decode the one or more resource blocks at the PDSCH location.

Example 9 includes the UE of any of Examples 1-8, wherein the UE comprises at least one of a speaker, a microphone, a connection port, a keyboard, a touch screen, a battery, a memory port, and one or more antennas.

Example 10 is an evolved universal terrestrial radio access network (E-UTRAN) Node B (eNB). The eNB includes a transceiver and a processor coupled to the transceiver. The processor is configured to receive an attach request from a first user equipment (UE) and determine, based on the attach request, that the first UE is a machine-type communication (MTC) device. In response to determining that the first UE is an MTC device, the processor is further configured to calculate a default channel location for downlink allocations based on a first cell radio network temporary identifier (C-RNTI) associated with the first UE. The processor is further configured to transmit, through the transceiver, a first downlink transmission for the first UE in the default channel location.

Example 11 includes the eNB of Example 10, wherein the processor is further configured to: after the transmit, wait for a hybrid automatic repeat request (HARQ) acknowledgment (ACK) from the first UE; if the ACK is not received within a period of time after the transmit, determine an implied negative ACK (NACK); and in response to the implied NACK, retransmit the first downlink transmission in the default channel location.

Example 12 includes the eNB of Example 11, wherein the processor is further configured to use Chase combining to retransmit the first downlink transmission.

Example 13 includes the eNB of any of Examples 10-12, wherein the processor is further configured to: before the transmit of the first downlink transmission for the first UE, scramble a first cyclic redundancy check (CRC) of the first downlink transmission with the first C-RNTI associated with the first UE; and before a second downlink transmission for a second UE in the default channel location, scramble a second CRC of the second downlink transmission with a second C-RNTI associated with the second UE.

Example 14 includes the eNB of any of Examples 10-13, wherein the default channel location comprises a physical downlink shared channel (PDSCH) location.

Example 15 includes the eNB of any of Examples 10-14, wherein the first downlink transmission comprises a sub-header to indicate a transmission type.

Example 16 includes the eNB of Example 15, wherein the transmission type is selected from a group comprising downlink data, downlink control information including downlink transmission parameters, and an uplink grant indicating available uplink resources.

Example 17 includes the eNB of Example 16, wherein the downlink transmission parameters comprise at least one of a second channel location for downlink allocations for the first UE and a modulation and coding scheme (MCS).

Example 18 includes the eNB of Example 17, wherein the processor is further configured to transmit, through the transceiver, a second downlink transmission for the first UE in the second channel location.

Example 19 is at least one computer-readable storage medium having stored thereon instructions that, when executed by one or more processors, cause the one or more processors to perform operations comprising: map a plurality of user equipments (UEs) to a first physical downlink shared channel (PDSCH) location for a downlink transmission; for a first subframe, schedule a downlink transmission for a target UE selected from the plurality of UEs; scramble a cyclic redundancy check (CRC) of the downlink transmission with a C-RNTI associated with the target UE; store the downlink transmission with the scrambled CRC in the first PDSCH location in the first subframe; and transmit the first subframe.

Example 20 includes the at least one computer-readable storage medium of Example 19, wherein the operations further comprise: set two bits in the download transmission to indicate a download type, wherein the download type is selected from a group comprising downlink data, downlink control information including downlink transmission parameters, and an uplink grant indicating available uplink resources.

Example 21 includes the at least one computer-readable storage medium of Example 20, wherein the downlink transmission parameters comprise a second PDSCH location, and wherein the operations further comprise: for a second subframe, schedule a subsequent downlink transmission for the target UE; scramble the CRC of the subsequent downlink transmission with the C-RNTI associated with the target UE; store the subsequent downlink transmission with the scrambled CRC in the second PDSCH location in the second subframe; and transmit the second subframe.

Example 22 includes the at least one computer-readable storage medium of Example 21, wherein the downlink transmission parameters further comprise an updated modulation and coding scheme (MCS) for the subsequent downlink transmission.

Example 23 includes the at least one computer-readable storage medium of any of Examples 19-22, wherein the operations further comprise: after the transmit, wait for a hybrid automatic repeat request (HARQ) acknowledgment (ACK) from the target UE; if the ACK is not received within a period of time after the transmit, determine an occurrence of an implied negative ACK (NACK); and in response to the implied NACK: store the same downlink transmission with the scrambled CRC in the first PDSCH location in a second subframe; and transmit the second subframe.

Example 24 is a method comprising: performing uplink synchronization with a base station; determining, based on a user equipment identifier (UE ID), a first physical downlink shared channel (PDSCH) location for a downlink transmission; and attempting, in a first subframe from the base station, to decode one or more resource blocks at the first PDSCH location based on the UE ID and predetermined downlink transmission parameters.

Example 25 includes the method of Example 24, further comprising determining, in response to a successful decode of the one or more resource blocks at the first PDSCH location, that the one or more resource blocks comprises one of downlink user data, updated downlink transmission parameters, or an uplink grant.

Example 26 includes the method of any of Examples 24-25, wherein the updated downlink transmission parameters comprise at least one of a second PDSCH location for downlink transmissions and a modulation and coding scheme (MCS).

Example 27 includes the method of any of Examples 24-26, further comprising attempting, in a second subframe from the base station, to decode one or more second resource blocks at the second PDSCH location based on the UE ID and the updated downlink transmission parameters.

Example 28 includes the method of any of Examples 24-27, wherein the downlink transmission corresponding to the one or more resource blocks at the first PDSCH location comprises a two bit sub-header to indicate whether the downlink transmission comprises the downlink user data, the updated downlink transmission parameters, or an the uplink grant.

Example 29 includes the method of any of Examples 24-28, wherein the UE ID comprises a cell radio network temporary identifier (C-RNTI) assigned by the base station during uplink synchronization, and wherein attempting to decode one or more resource blocks comprises decoding a cyclic redundancy check (CRC) scrambled with the C-RNTI.

Example 30 includes the method of any of Examples 24-29, wherein the circuitry is further configured to: if the attempt to decode the one or more resource blocks at the PDSCH location is unsuccessful, determine that the first subframe does not include a downlink transmission for the UE; and if the attempt to decode the one or more resource blocks at the PDSCH location is successful, send a hybrid automatic repeat request (HARQ) acknowledgment (ACK) to the base station.

Example 31 includes the method of any of Examples 24-30, wherein the circuitry is further configured to not send a HARQ negative acknowledgment (NACK) in response to the unsuccessful attempt to decode the one or more resource blocks at the PDSCH location.

Example 32 includes the method of any of Examples 24-31, wherein the UE comprises at least one of a speaker, a microphone, a connection port, a keyboard, a touch screen, a battery, a memory port, and one or more antennas.

Example 33 is a method comprising: receiving an attach request from a first user equipment (UE); determining, based on the attach request, that the first UE is a machine-type communication (MTC) device; in response to determining that the first UE is an MTC device, calculating a default channel location for downlink allocations based on a first cell radio network temporary identifier (C-RNTI) associated with the first UE; and transmitting, through the transceiver, a first downlink transmission for the first UE in the default channel location.

Example 34 includes the method of Example 33, further comprising: waiting, after the transmit, for a hybrid automatic repeat request (HARQ) acknowledgment (ACK) from the first UE; if the ACK is not received within a period of time after the transmit, determining an implied negative ACK (NACK); and retransmitting, in response to the implied NACK, the first downlink transmission in the default channel location.

Example 35 includes the method of any of Examples 33-34, further comprising using Chase combining to retransmit the first downlink transmission.

Example 36 includes the method of any of Examples 33-35, further comprising: scrambling, before the transmit of the first downlink transmission for the first UE, a first cyclic redundancy check (CRC) of the first downlink transmission with the first C-RNTI associated with the first UE; and scrambling, before a second downlink transmission for a second UE in the default channel location, a second CRC of the second downlink transmission with a second C-RNTI associated with the second UE.

Example 37 includes the method of any of Examples 33-36, wherein the default channel location comprises a physical downlink shared channel (PDSCH) location.

Example 38 includes the method of any of Examples 33-37, wherein the first downlink transmission comprises a sub-header to indicate a transmission type.

Example 39 includes the method of any of Examples 33-38, further comprising selecting the transmission type from a group comprising downlink data, downlink control information including downlink transmission parameters, and an uplink grant indicating available uplink resources.

Example 40 includes the method of any of Examples 33-39, wherein the downlink transmission parameters comprise at least one of a second channel location for downlink allocations for the first UE and a modulation and coding scheme (MCS).

Example 41 includes the method of any of Examples 33-40, further comprising transmitting a second downlink transmission for the first UE in the second channel location.

Example 42 is at least one computer-readable storage medium having stored thereon computer-readable instructions, when executed, to implement a method as recited in any of Examples 24-41.

Example 43 is an apparatus comprising means to perform a method or implement an apparatus as recited in any preceding Example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. A user equipment (UE), comprising:
a memory to store default locations for downlink transmission, wherein the default locations are associated with potential UE identifiers;
a wireless transceiver to communicate with an Evolved Universal Terrestrial Radio Access Network (E-UTRAN) Node B (eNB); and
circuitry to:
perform uplink synchronization with the eNB, wherein a UE identifier (ID) is assigned during uplink synchronization;
determine a first location in a physical downlink shared channel (PDSCH) for a downlink transmission by using the UE ID to identify which default location, from the stored default locations, is associated with the UE ID, and using the identified default location as the first location; and
in a first subframe from the eNB, attempt to decode one or more resource blocks at the first location in the PDSCH based on the UE ID and predetermined downlink transmission parameters.

2. The UE of claim 1, wherein the circuitry is further configured to:
in response to a successful decode of the one or more resource blocks at the first location in the PDSCH, determine that the one or more resource blocks comprises one of downlink user data, updated downlink transmission parameters, or an uplink grant.

3. The UE of claim 2, wherein the updated downlink transmission parameters comprise at least one of a second location in the PDSCH for downlink transmissions and a modulation and coding scheme (MCS).

4. The UE of claim 2, wherein the circuitry is further configured to:
in a second subframe from the eNB, attempt to decode one or more second resource blocks at the second location in the PDSCH based on the UE ID and the updated downlink transmission parameters.

5. The UE of claim 2, wherein the downlink transmission corresponding to the one or more resource blocks at the first location in the PDSCH comprises a two bit sub-header to indicate whether the downlink transmission comprises the downlink user data, the updated downlink transmission parameters, or the uplink grant.

6. The UE of claim 1, wherein the UE ID comprises a cell radio network temporary identifier (C-RNTI) assigned by the eNB during the uplink synchronization, and wherein the attempt to decode the one or more resource blocks comprises decoding a cyclic redundancy check (CRC) scrambled with the C-RNTI.

7. The UE of claim 1, wherein the circuitry is further configured to:
if the attempt to decode the one or more resource blocks at the first location in the PDSCH is unsuccessful, determine that the first subframe does not include a downlink transmission for the UE; and
if the attempt to decode the one or more resource blocks at the first location in the PDSCH is successful, send a hybrid automatic repeat request (HARQ) acknowledgment (ACK) to the eNB.

8. The UE of claim 7, wherein the circuitry is further configured to not send a HARQ negative acknowledgment (NACK) in response to the unsuccessful attempt to decode the one or more resource blocks at the first location in the PDSCH.

9. The UE of claim 1, wherein the UE comprises at least one of a speaker, a microphone, a connection port, a keyboard, a touch screen, a battery, a memory port, and one or more antennas.

10. An evolved universal terrestrial radio access network (E-UTRAN) Node B (eNB), the eNB comprising:
a transceiver; and
a processor coupled to the transceiver, the processor configured to:
receive an attach request from a first user equipment (UE);
determine, based on the attach request, that the first UE is a machine-type communication (MTC) device;
in response to determining that the first UE is an MTC device, calculate a default location in a channel for downlink allocations using a function with a first cell radio network temporary identifier (C-RNTI) associated with the first UE as a variable, wherein the default location is not sent to the first UE via a control channel, wherein the default location is where the first UE will look for a downlink transmission before the eNB sends a signal specifying a downlink location, wherein the function is used by the first UE to calculate the default location in the channel for downlink allocations using the C-RNTI assigned during uplink synchronization; and
transmit, through the transceiver, a first downlink transmission for the first UE at the default location in the channel.

11. The eNB of claim 10, wherein the processor is further configured to:
after the transmit, wait for a hybrid automatic repeat request (HARQ) acknowledgment (ACK) from the first UE;
if the ACK is not received within a period of time after the transmit, determine an implied negative ACK (NACK); and
in response to the implied NACK, retransmit the first downlink transmission at the default location in the channel.

12. The eNB of claim 11, wherein the processor is further configured to use Chase combining to retransmit the first downlink transmission.

13. The eNB of claim 10, wherein the processor is further configured to:
before the transmit of the first downlink transmission for the first UE, scramble a first cyclic redundancy check (CRC) of the first downlink transmission with the first C-RNTI associated with the first UE; and
before a second downlink transmission for a second UE in the location, scramble a second CRC of the second downlink transmission with a second C-RNTI associated with the second UE.

14. The eNB of claim 10, wherein the channel comprises a physical downlink shared channel (PDSCH).

15. The eNB of claim 10, wherein the first downlink transmission comprises a sub-header to indicate a transmission type.

16. The eNB of claim 15, wherein the transmission type is selected from a group comprising downlink data, downlink control information including downlink transmission parameters, and an uplink grant indicating available uplink resources.

17. The eNB of claim 16, wherein the downlink transmission parameters comprise at least one of a second channel location for downlink allocations for the first UE and a modulation and coding scheme (MCS).

18. The eNB of claim 17, wherein the processor is further configured to transmit, through the transceiver, a second downlink transmission for the first UE in the second channel location.

19. At least one non-transitory computer-readable storage medium having stored thereon instructions that, when executed by one or more processors, cause the one or more processors to perform operations comprising:

map a plurality of user equipments (UEs) to a first location in a physical downlink shared channel (PDSCH), wherein the UEs are mapped to the first location using a cell radio network temporary identifier (C-RNTI) associated with a UE in the plurality of UEs, such that the UE can compute the first location using the C-RNTI assigned during uplink synchronization, wherein the first location is a default location based on the C-RNTI where the UE will look for a downlink transmission before the eNB sends an updated location, wherein the default location is not sent to the UE with control signal resources;

for a first subframe, schedule a downlink transmission for a target UE selected from the plurality of UEs;

scramble a cyclic redundancy check (CRC) of the downlink transmission with a C-RNTI associated with the target UE;

store the downlink transmission with the scrambled CRC in the first location in the first subframe; and transmit the first subframe.

20. The at least one non-transitory computer-readable storage medium of claim 19, wherein the operations further comprise:

set two bits in the downlink transmission to indicate a download type, wherein the download type is selected from a group comprising downlink data, downlink control information including downlink transmission parameters, and an uplink grant indicating available uplink resources.

21. The at least one non-transitory computer-readable storage medium of claim 20, wherein the downlink transmission parameters comprise a second location in the PDSCH, and wherein the operations further comprise:

for a second subframe, schedule a subsequent downlink transmission for the target UE;

scramble the CRC of the subsequent downlink transmission with the C-RNTI associated with the target UE;

store the subsequent downlink transmission with the scrambled CRC in the second location in the second subframe; and transmit the second subframe.

22. The at least one non-transitory computer-readable storage medium of claim 21, wherein the downlink transmission parameters further comprise an updated modulation and coding scheme (MCS) for the subsequent downlink transmission.

23. The at least one non-transitory computer-readable storage medium of claim 19, wherein the operations further comprise:

after the transmit, wait for a hybrid automatic repeat request (HARQ) acknowledgment (ACK) from the target UE;

if the ACK is not received within a period of time after the transmit, determine an occurrence of an implied negative ACK (NACK); and in response to the implied NACK:

store the same downlink transmission with the scrambled CRC in the first location in a second subframe; and transmit the second subframe.

* * * * *